Oct. 5, 1926.
J. FORSTER
TELEPHONE CABLE
Filed Feb. 3, 1923
1,601,817
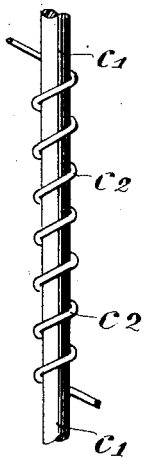
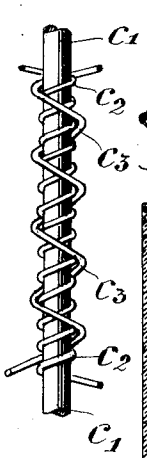
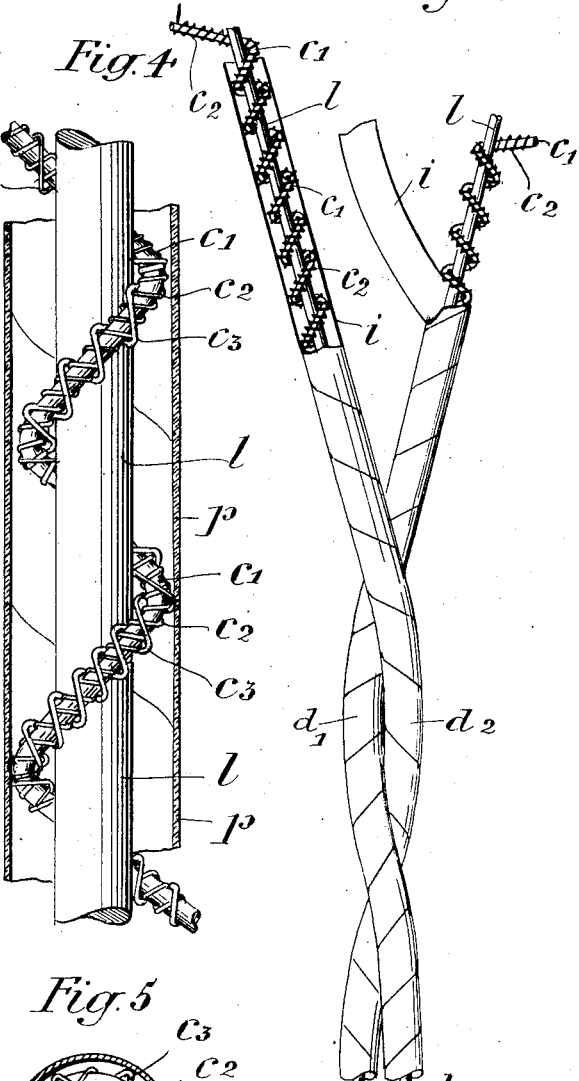
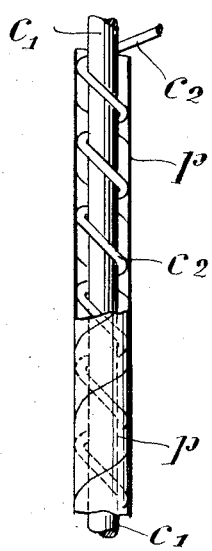
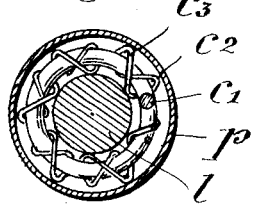
Inventor
J. Forster
By Marks & Clerk
Attys.

Patented Oct. 5, 1926.

1,601,817

UNITED STATES PATENT OFFICE.

JOSEF FORSTER, OF VIENNA, AUSTRIA, ASSIGNOR TO ALFRED ROTH, OF VIENNA, AUSTRIA.

TELEPHONE CABLE.

Application filed February 3, 1923, Serial No. 616,835, and in Austria January 26, 1922.

Telephone cables must have the smallest possible capacity and leakage. To that end the conductors of telephone cables were hitherto wound with a simple paper cord to attain an exact distance of the wires. The capacity and leakage of a telephone cable are as much smaller as the mass of the cord decreases for a constant diameter of the material to ensure the distance The intention is consequently to reduce the mass of the cord to a minimum, allowing at the same time its outer diameter to be as large as possible.

This is brought about by the combination cord of this invention as illustrated schematically by way of example according to Fig. 1–3 in the accompanying drawing.

Fig. 1 illustrates a simple combination cord consisting of a central cord around which is wound a second cord.

Fig. 2 shows a combination cord consisting of a central cord, around which two cords are wound in opposite directions.

Fig. 3 illustrates a simple combination cord as shown in Fig. 1 and having a wrapper of paper.

Fig. 4 illustrates a conductor on a large scale provided with simple cord insulation as shown in Fig. 1.

Fig. 5 is a sectional end view of the conductor and insulation shown in Fig. 4.

Fig 6 is a perspective view of two conductors provided with simple combination cords and covers of paper wound around the conductors.

The combination cord consists of a central cord $c_1$ of paper or of other suitable material (Fig. 1) round which a second cord $c_2$ also of paper or of other suitable material is wound helically.

The pitch of the helical windings is made as great as possible. The free space between two succeeding windings is not allowed to be considerably greater than the diameter of the conductor, however, as otherwise the latter would easily be pressed between the windings of the combination cord. The pitch of the windings should increase with the strength of the cord $c_2$ as otherwise the free space between two succeeding windings would be too small.

The pitch of the helical windings therefore shall be dependent upon the diameter of the conductor and the diameter of the cord $c_1$. The mass of this combination cord is much smaller than that of a simple cord of the same outer diameter. If the diameter of the central cord $c_1$ is referred to as D and that of the wound cord $c_2$ as $d$, the outer diameter of the combination cord becomes D+2$d$. The ability of attaining an exact distance of the wires is the same for the combination cord as for a simple round cord with a diameter of D+2$d$ whilst the mass of the combination cord is much smaller because of the cross-section of the combination cord being much smaller than that of the simple cord with a diameter of D+2$d$.

The combination cords $c_1$, $c_2$ as produced in this manner are wound helically around the cable conductors as may be seen from Figures 4 and 5.

Fig. 2 shows a combination cord consisting also of a central cord 1, round which two cords $c_2$ and $c_3$ are wound however in opposite directions.

Fig. 3 shows a combination cord according to Fig. 1, which is covered with a layer of paper $p$ in order to enable the pitch of the wound cord $c_2$ to be made greater independently of the diameter of the conductor. In the same manner also the combination cord as shown in Fig. 2 may be covered with a layer of paper.

Fig. 6 shows two conductors $a_1$, $a_2$ consisting each of a cable conductor 1 around which combination cords $c_1$, $c_2$ are wound and covered with a layer of paper $i$. The pitch of the combination cords $c_1$, $c_2$ as wound on a conductor is made as great as possible. Care must be taken, however, to support the applied layer of paper $i$ sufficiently as otherwise when twisting the conductors $a_1$, $a_2$ into pairs, as shown in Fig. 6, and the pairs into cables, the paper cover between two windings might yield too much and perhaps break.

Claims:

1. A telephone cable comprising in combination, a conductor, an insulating cord for said conductor, said insulating cord comprising a central cord of fibrous material and a plurality of cords of fibrous material wound helically around said central cord, said insulating cord being wound helically around said conductor and having its convolutions spaced apart.

2. A telephone cable as claimed in claim 1, one of said plurality of cords being wound in a direction opposite to the direction of the winding of the others of said plurality of cords.

3. A telephone cable as claimed in claim 1, in combination with a paper cover enclosing said conductor and its insulating cords.

In testimony whereof I have affixed my signature.

JOSEF FORSTER.